United States Patent
Li et al.

(10) Patent No.: US 10,757,734 B2
(45) Date of Patent: Aug. 25, 2020

(54) METHOD FOR FACILITATING CLEAR CHANNEL ASSESSMENT AND RADIO UNIT

(71) Applicant: Telefonaktiebolaget LM Ericsson (publ), Stockholm (SE)

(72) Inventors: Ming Li, Beijing (CN); Yanqiang Li, Beijing (CN); Jinhua Liu, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/314,786

(22) PCT Filed: Jul. 11, 2016

(86) PCT No.: PCT/CN2016/089640
§ 371 (c)(1),
(2) Date: Jan. 2, 2019

(87) PCT Pub. No.: WO2018/010066
PCT Pub. Date: Jan. 18, 2018

(65) Prior Publication Data
US 2019/0320462 A1    Oct. 17, 2019

(51) Int. Cl.
*H04W 72/02* (2009.01)
*H04W 74/08* (2009.01)
*H04L 27/00* (2006.01)

(52) U.S. Cl.
CPC ..... *H04W 74/0808* (2013.01); *H04L 27/0006* (2013.01); *H04W 72/02* (2013.01)

(58) Field of Classification Search
CPC . H04W 74/00; H04W 74/08; H04W 74/0808; H04W 72/00; H04W 72/02;
(Continued)

(56) References Cited

U.S. PATENT DOCUMENTS

2012/0082147 A1* 4/2012 Liu ............... H04L 5/001 370/338
2015/0049715 A1* 2/2015 Yerramalli ......... H04L 5/1469 370/329
(Continued)

FOREIGN PATENT DOCUMENTS

CN    105309033 A    2/2016
CN    105515740 A    4/2016
(Continued)

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 13)", 3GPP TS 36.212 V13.2.0, Jun. 2016, 1-140.
(Continued)

*Primary Examiner* — Warner Wong
(74) *Attorney, Agent, or Firm* — Sage Patent Group (57) ABSTRACT

The present disclosure provides a method (300) in a Radio Unit (RU) for facilitating Clear Channel Assessment (CCA). The method (300) comprises: detecting (S310), in a first transmission period while the RU is operating in a first channel, whether one or more candidate channels in proximity to the first channel are unoccupied; determining (S320), when the first channel is not clear for transmission in a second transmission period, whether any of the one or more candidate channels that is detected to be unoccupied is clear for transmission in the second transmission period; and selecting (S330) one of the one or more candidate channels that is determined to be clear, for transmission in the second transmission period.

11 Claims, 6 Drawing Sheets

(58) Field of Classification Search
CPC . H04W 72/0453; H04W 72/12; H04W 28/00; H04W 28/0252; H04W 27/0006; H04L 27/0006
See application file for complete search history.

(56) References Cited

U.S. PATENT DOCUMENTS

| | | | | |
|---|---|---|---|---|
| 2015/0098397 | A1* | 4/2015 | Damnjanovic | H04W 74/08 370/329 |
| 2015/0373652 | A1 | 12/2015 | Dabeer et al. | |
| 2015/0373741 | A1 | 12/2015 | Yerramalli et al. | |
| 2016/0037365 | A1* | 2/2016 | Makrakis | H04L 1/1825 370/252 |
| 2016/0128070 | A1* | 5/2016 | Hanusch | H04W 74/0808 370/252 |
| 2016/0301509 | A1* | 10/2016 | Narasimha | H04L 5/0062 |
| 2017/0188342 | A1* | 6/2017 | Liu | H04W 72/042 |
| 2018/0103458 | A1* | 4/2018 | Tooher | H04W 16/14 |
| 2018/0213571 | A1* | 7/2018 | Wang | H04W 74/0808 |
| 2019/0090240 | A1* | 3/2019 | Ahn | H04W 72/0413 |

FOREIGN PATENT DOCUMENTS

| | | |
|---|---|---|
| JP | H07274238 A | 10/1995 |
| WO | 2013006988 A1 | 1/2013 |

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.3.0, May 2008, 1-77.

Extended European Search Report dated Feb. 13, 2020 for European Patent Application No. 16908398.7, 8 pages.

* cited by examiner

METHOD FOR FACILITATING CLEAR CHANNEL ASSESSMENT AND RADIO UNIT

TECHNICAL FIELD

The present disclosure relates to radio communications, and more particularly, to a method for facilitating Clear Channel Assessment (CCA) and a Radio Unit (RU).

BACKGROUND

Figure 1:
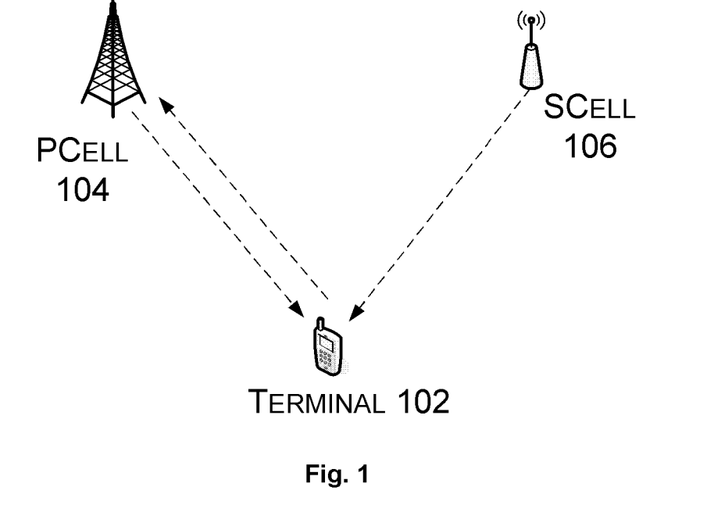
FIG. 1 is a schematic diagram showing LAA-LTE.

Licensed Assisted Access (LAA), based on Carrier Aggregation (CA), has been proposed in Long Term Evolution (LTE) systems to utilize additional bandwidth in unlicensed spectrums. FIG. 1 is a schematic diagram showing LAA-LTE. As shown, a terminal device 102, also known as User Equipment (UE) in LTE, is served by a Primary Cell (PCell) 104 operating in a licensed frequency band and a Secondary Cell (SCell) 106 operating in an unlicensed frequency band. The PCell 104 exchanges with the terminal device 102 essential control messages and also provides always-available robust spectrums for real-time and/or high-priority traffic. The PCell 104 also provides mobility management for the terminal device 102 via an LTE radio access network. The SCell 106 can be utilized as a bandwidth booster to serve, e.g., best effort traffic. The SCell 106 typically operates in a downlink-only mode.

Figure 2:
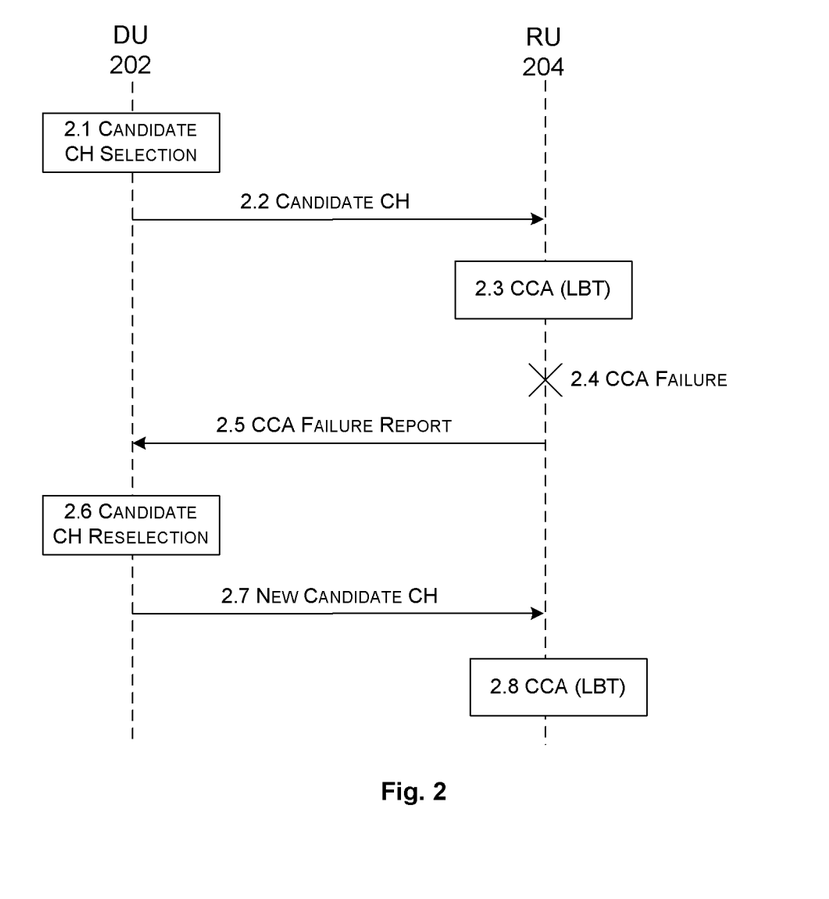
FIG. 2 is a schematic diagram showing a simplified signaling sequence for a channel management mechanism in an AP.

In order to co-exist with Wireless Local Area Network (WLAN) and other radio communication systems operating in unlicensed spectrums, an Access Point (AP) associated with the SCell 106 incorporates a particular channel management mechanism. FIG. 2 shows a simplified signaling sequence for this mechanism in the AP. The AP includes a Digital Unit (DU) 202, also known as a Base-Band Unit (BBU), and a Radio Unit (RU) 204. As shown, at 2.1, the DU 202 selects a candidate channel by performing e.g., channel scanning. At 2.2, the DU 202 indicates the selected candidate channel to the RU 204. Then, at 2.3, the RU 204 applies Clear Channel Assessment (CCA) by performing Listen Before Talk (LBT) on the candidate channel to determine whether it is occupied or clear for transmission.

If the CCA succeeds, the RU 204 can send a reservation signal generated by the DU 202 over the candidate channel to occupy the channel. On the other hand, if the CCA fails (e.g., when no CCA succeeds before a predefined timer expires or the number of CCA failures has reached a predetermined value) at 2.4, the RU 204 sends a CCA failure report to the DU 202 at 2.5 to inform the DU 202 of the failure. Then, at 2.6, the DU 202 reselects a new candidate channel and indicates it to the RU 204 at 2.7. At 2.8, the RU 204 applies CCA on the new candidate channel to determine whether it is occupied or clear for transmission. If the CCA succeeds this time, the RU 204 can send a reservation signal generated by the DU 202 over the new candidate channel. If the CCA fails again, the RU 204 will send another CCA failure report to the DU 202 to request another candidate channel.

It can be seen from above that, when a CCA failure occurs on a candidate channel, the RU 204 needs to report the failure to the DU 202 and wait for a new candidate channel indicated from the DU 202. This causes a significant delay in the CCA procedure, particularly when there is a large distance between the DU 202 and the RU 204. Such delay may greatly degrade the performance of the LAA-LTE system as it reduces the chance that the AP can seize an unlicensed channel in competing with other co-existing systems.

There is thus a need for an improved solution for CCA.

SUMMARY

It is an object of the present disclosure to provide a method for facilitating CCA and an RU, capable of reducing the delay associated with a CCA failure.

In a first aspect, a method in a Radio Unit (RU) for facilitating Clear Channel Assessment (CCA) is provided. The method comprises detecting, in a first transmission period while the RU is operating in a first channel, whether one or more candidate channels in proximity to the first channel are unoccupied; and determining, when the first channel is not clear for transmission in a second transmission period, whether any of the one or more candidate channels that is detected to be unoccupied is clear for transmission in the second transmission period. The method further comprises selecting one of the one or more candidate channels that is determined to be clear, for transmission in the second transmission period.

In an embodiment, the step of detecting may be implemented by applying a transmitter shutdown to a transmitter in the RU during one or more predetermined symbols in the first transmission period, sensing whether an energy level received in each candidate channel during the one or more predetermined symbols is lower than a predetermined threshold, and then detecting a candidate channel to be unoccupied when the energy level received in that candidate channel during the one or more predetermined symbols is lower than the predetermined threshold.

In an embodiment, when the transmitter shutdown is applied in two or more predetermined symbols, the sensing may be implemented by calculating an arithmetic or weighted average of the energy levels received in each candidate channel during the two or more predetermined symbols and determining whether the average is lower than the predetermined threshold.

In an embodiment, the transmitter shutdown may be applied by shutting down the transmitter intermittently in each of the one or more predetermined symbols.

In an embodiment, the method may further comprise informing a terminal device of the one or more predetermined symbols.

In an embodiment, the one or more predetermined symbols may comprise Guard Period (GP) and Uplink Pilot Time Slot (UpPTS) in a Time Division Duplex (TDD) special subframe.

In an embodiment, the step of detecting may be implemented by applying an attenuation to a receiver in the RU during one or more predetermined symbols in the first transmission period, sensing whether an attenuated energy level received by the receiver in each candidate channel during the one or more predetermined symbols is lower than a predetermined threshold, and then detecting a candidate channel to be unoccupied when the attenuated energy level received in that candidate channel during the one or more predetermined symbols is lower than the predetermined threshold.

In an embodiment, the method may further comprise transmitting a reservation signal over the selected candidate channel, reporting the selected candidate channel to a Digital Unit (DU), and receiving a transmission configuration associated with the selected candidate channel from the DU.

In an embodiment, the method may further comprise reporting a CCA failure to a Digital Unit (DU) only when none of the one or more candidate channels is detected to be unoccupied or determined to be clear.

In an embodiment, the method may further comprise selecting the first channel for transmission in the second transmission period when the first channel is clear for transmission in the second transmission period.

In an embodiment, the method may further comprise monitoring a CCA failure rate at the RU. The steps of detecting, determining and selecting are performed only when the CCA failure rate is higher than a predetermined level.

In a second aspect, a Radio Unit (RU) is provided for facilitating Clear Channel Assessment (CCA). The RU comprises a detecting unit, a determining unit, and a selecting unit. The detecting unit is configured to detect, in a first transmission period while the RU is operating in a first channel, whether one or more candidate channels in proximity to the first channel are unoccupied. The determining unit is configured to determine, when the first channel is not clear for transmission in a second transmission period, whether any of the one or more candidate channels that is detected to be unoccupied is clear for transmission in the second transmission period. The selecting unit is configured to select one of the one or more candidate channels that is determined to be clear, for transmission in the second transmission period.

In a third aspect, a Radio Unit (RU) is provided. The RU comprises a transceiver, a processor and a memory. The memory contains instructions executable by the processor whereby the RU is operative to: detect, in a first transmission period while the RU is operating in a first channel, whether one or more candidate channels in proximity to the first channel are unoccupied; determine, when the first channel is not clear for transmission in a second transmission period, whether any of the one or more candidate channels that is detected to be unoccupied is clear for transmission in the second transmission period; and select one of the one or more candidate channels that is determined to be clear, for transmission in the second transmission period.

The above embodiments of the first aspect are also applicable for the second and third aspects.

In a fourth aspect, a communication device is provided. The communication device comprises the RU according to the second or third aspect. The communication device can be an Access Point (AP) or a terminal device.

With the embodiments of the present disclosure, while the RU is transmitting in a current channel in a first transmission period, it can detect whether one or more candidate channels near the current channel are unoccupied or not. When the current channel is not clear for transmission in a subsequent, second transmission period (i.e., when a CCA failure occurs in the current channel), the RU can perform CCA to determine whether any of the unoccupied candidate channels is clear for transmission in the second transmission period. If so, a candidate channel that is determined to be clear can be selected for transmission in the second transmission period. Hence, there is no need for the RU to report a CCA failure to a DU to request a new candidate channel, as long as there is at least one candidate channel that is clear for transmission in the second transmission period. In this way, the overall delay associated with the CCA failure can be greatly reduced and the capability to seize an unlicensed channel in competing with other co-existing systems can thus be improved.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

References in the specification to "one embodiment," "an embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "Access Point" or AP refers to a device in a wireless communication network via which a terminal device accesses the network and receives services therefrom. The Access Point or AP may refer to a base station (BS), a node B (NodeB or NB), an evolved NodeB (eNodeB or eNB), a Remote Radio Unit (RRU), a radio head (RH), a remote radio head (RRH), Access Node (AN), a relay node (RN), or a low power node (LPN) such as a femto, a pico, and so forth, depending on the applied terminology and technology.

The term "terminal device" refers to any end device having wireless communication capabilities. By way of example and not limitation, a terminal device may be referred to as user equipment (UE), which may be a Subscriber Station (SS), a Portable Subscriber Station, a Mobile Station (MS), or an Access Terminal (AT). The terminal device may include, but not limited to, mobile phones, cellular phones, smart phones, or personal digital assistants (PDAs), portable computers, image capture terminal devices such as digital cameras, gaming terminal devices, music storage and playback appliances, wearable terminal devices, vehicle-mounted wireless terminal devices and the like. In this document, the terms "terminal device", "terminal", "user equipment" and "UE" may be used interchangeably.

Figure 3:
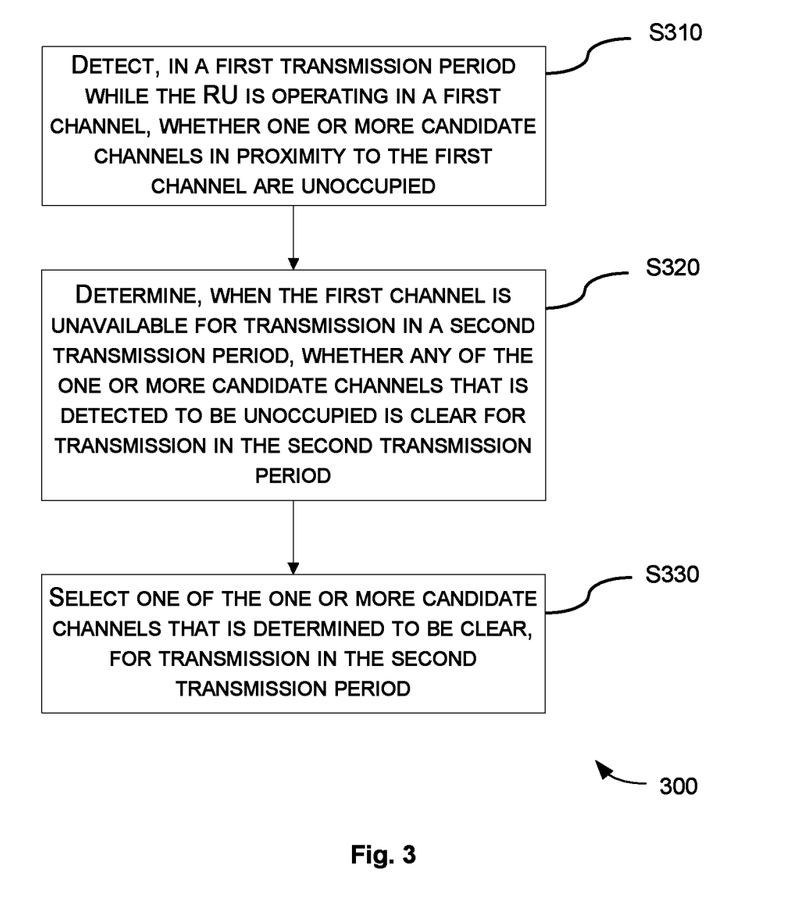
FIG. 3 is a flowchart illustrating a method for facilitating CCA according to an embodiment of the present disclosure.

FIG. 3 is a flowchart illustrating a method 300 for facilitating CCA according to an embodiment of the present disclosure. The method 300 can be performed in an RU, e.g., the RU 204. The method may be implemented in a communication device supporting LBT, such as an AP associated with the SCell 106 as described above, or a terminal device, like terminal 102 as described above with reference to FIG. 1. The method 300 includes the following steps.

At step S310, in a first transmission period while the RU is operating in a first channel, it is detected whether one or more candidate channels in proximity to the first channel are unoccupied. Since the detection here is performed prior to the CCA in the step S320 (which will be described later), it is also referred to as "pre-CCA" in this context.

Figure 4:
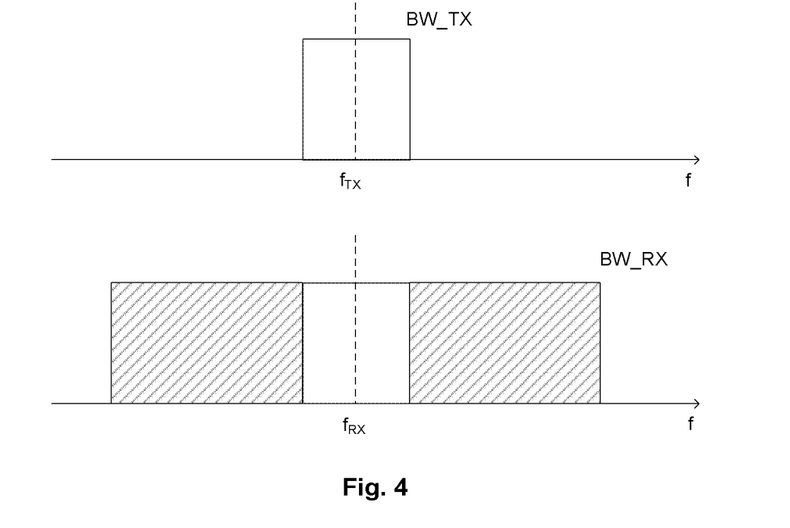
FIG. 4 is a schematic diagram showing an asymmetric TX/RX bandwidth configuration.

Referring to FIG. 4, an asymmetric transmitting/receiving (TX/RX) bandwidth configuration can be applied here. As shown, the TX and RX frequency bands can be centered at the same frequency and the RX bandwidth can be wider than the TX bandwidth, so as to allow additional frequency ranges (shown as hatched areas) to be detected. That is, while the RU is transmitting in the first channel having a bandwidth of BW_TX, it has a wider RX bandwidth of BW_RX, over which the RU can detect whether one or more candidate channels are occupied or not. In an example, the one or more candidate channels may include channels over the entire RX bandwidth other than the bandwidth of the first channel. The candidate channels may or may not be adjacent to the first channel.

In an example, in the step S310, a transmitter shutdown can be applied to a transmitter in the RU during one or more predetermined symbols in the first transmission period. Then, it is sensed whether an energy level received in each candidate channel during the one or more predetermined symbols is lower than a predetermined threshold. In this case, a candidate channel may be detected to be unoccupied when the energy level received in that candidate channel during the one or more predetermined symbols is lower than the predetermined threshold.

Figure 5:
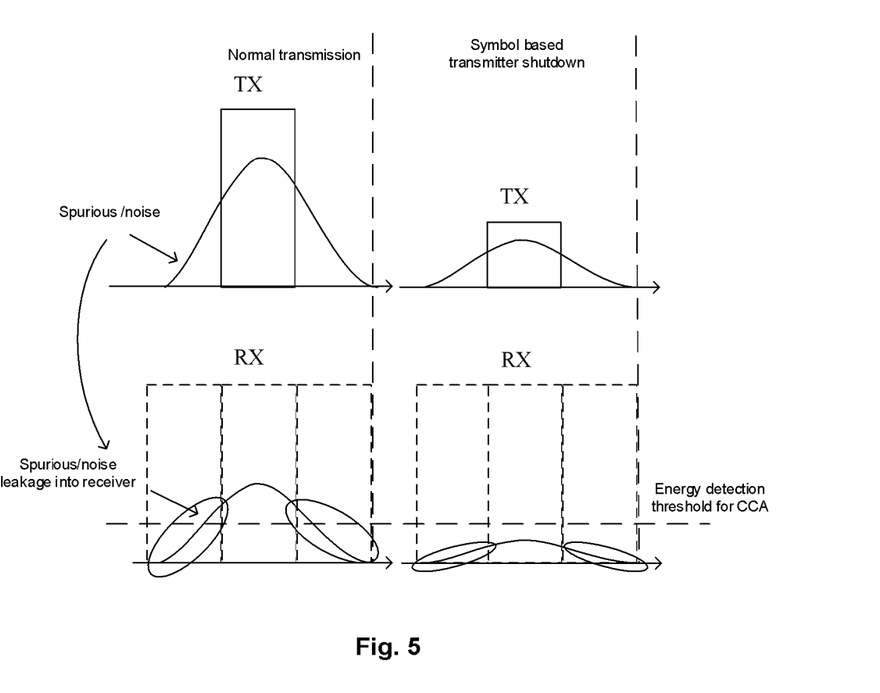
FIG. 5 is a schematic diagram showing an exemplary energy distribution over frequency spectrums.

In particular, the transmitter shutdown can be a symbol based transmitter shutdown. This can be realized by means of digital transmission power level reduction. FIG. 5 shows an exemplary energy distribution over frequency spectrums. As shown, when the symbol based transmitter shutdown is applied, the noise floor in each channel adjacent to the channel to which the transmitter shutdown is applied may be reduced, which makes it possible to detect whether the adjacent channels are unoccupied or not. In FIG. 5, the application of shutdown to the transmitter in a downlink channel causes the noise floor in two adjacent channels to be reduced below an energy detection threshold for CCA, and thereby the two adjacent channels may be detected to be unoccupied.

Optionally, when the transmitter shutdown is applied in two or more predetermined symbols, in the step S310, an arithmetic or weighted average of the energy levels received in each candidate channel during the two or more predetermined symbols is calculated and it is determined whether the average is lower than the predetermined threshold. When the weighted average is calculated, a higher weight is assigned to a symbol closer to the end of the first transmission period, as a symbol closer to the end of the first transmission period is more likely to have the same interference status as the next transmission period.

In an example, in order to avoid any failure at a terminal device in demodulating the predetermined symbol(s), the terminal device can be informed of the predetermined symbol(s). For example, a new Control Format Indicator (CFI) can be defined to indicate to the terminal device which symbol(s) is/are used for transmitter shutdown and thus not to be demodulated by the terminal device. Alternatively, some existing CFIs, such as CFI 2 and CFI 3, can be used, where some predefined symbols for control channels can be used for transmitter shutdown. For details of the CFIs, reference can be made to e.g., 3GPP TS 36.212 V13.2.0.

Alternatively, a Time Division Duplex (TDD) special subframe can be used for transmitter shutdown. In this case, the transmitter shutdown may occur in Guard Period (GP) and Uplink Pilot Time Slot (UpPTS) in the TDD special subframe, while Downlink Pilot Time Slot (DwPTS) can be used for data transmission. There are nine configurations for the special subframe with a regular cyclic prefix, as shown in Table 1 below. Table 1 shows the number of symbols in each of DwPTS, GP and UpPTS in different special subframe configurations. For example, the 12:1:1 configuration can be used here. For details of the special subframe, reference can be made to e.g., 3GPP TS 36.211 v8.3.0.

TABLE 1

| TDD Special Subframe Configurations | | | | | | | | |
|---|---|---|---|---|---|---|---|---|
| DwPTS | 12 | 11 | 11 | 10 | 10 | 9 | 9 | 3 | 3 |
| GP | 1 | 1 | 2 | 2 | 3 | 3 | 4 | 9 | 10 |
| UpPTS | 1 | 2 | 1 | 2 | 1 | 2 | 1 | 2 | 1 |

In an example, the one or more predetermined symbols can be distributed over one or more subframes, and/or can be continuous or discontinuous over time.

Figure 6:
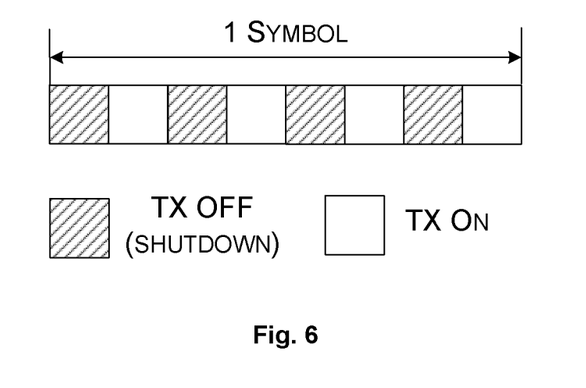
FIG. 6 is a schematic diagram showing an exemplary on/off pattern within one symbol.

In an example, in order to prevent any other device performing CCA during the one or more predetermined symbols from sensing the first channel to be clear, the transmitter can be shut down intermittently in each of the one or more predetermined symbols. FIG. 6 shows an exemplary on/off pattern within one symbol. As shown, one symbol can be divided into a number of TX-off intervals where the transmitter is shut down and a number of TX-on intervals where the transmitter is turned on to prevent a false "clear" channel from being detected by any other devices.

Alternatively, in the step S310, an attenuation can be applied to a receiver in the RU during one or more predetermined symbols. Then, it is sensed whether an attenuated energy level received by the receiver in each candidate channel during the one or more predetermined symbols is lower than a predetermined threshold. In this case, a candidate channel is detected to be unoccupied when the attenuated energy level received in that candidate channel during the one or more predetermined symbols is lower than the predetermined threshold.

Figure 7:
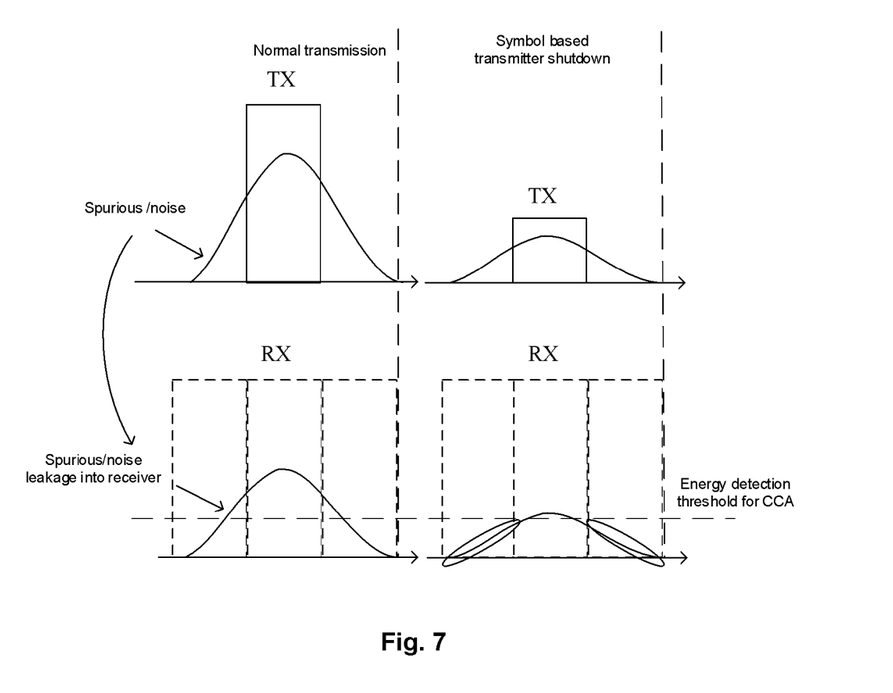
FIG. 7 is a schematic diagram showing another exemplary energy distribution over frequency spectrums.

In this case, instead of applying a transmitter shutdown, an attenuation can be applied to the receiver to reduce the noise floor at the receiver during the predetermined symbol(s). FIG. 7 shows another exemplary energy distribution over frequency spectrums. As shown, when the attenuation is applied, the noise floor in each channel adjacent to the channel to which the attenuation is applied may be reduced, which makes it possible to detect whether the adjacent channels are unoccupied or not. In FIG. 7, the application of attenuation to the receiver in a downlink channel causes the noise floor in two adjacent channels to be reduced below an energy detection threshold for CCA, and thereby the two adjacent channels may be detected to be unoccupied. Meanwhile, since the transmitter is not shut down during the predetermined symbol(s), it is possible to prevent a false "clear" channel from being detected by any other devices.

Next, at step S320, when the first channel is not clear for transmission in a second transmission period, it is determined whether any of the one or more candidate channels that is detected to be unoccupied is clear for transmission in the second transmission period.

Then, at step S330, one of the one or more candidate channels that is determined to be clear is selected for transmission in the second transmission period.

On the other hand, when the first channel is clear for transmission in the second transmission period, the first channel is preferentially selected for transmission in the second transmission period.

In other words, in the second transmission period subsequent to the first transmission period, a CCA can be first applied to the first channel to determine whether the first channel is clear for transmission. If so, the first channel is selected for transmission. Otherwise, it is determined, by means of CCA, whether a candidate channel that is detected to be unoccupied in the step S310 is clear for transmission and then one candidate channel that is determined to be clear is selected for transmission.

When the candidate channel is selected for transmission in the second transmission period, a reservation signal can be transmitted over the selected candidate channel to seize the channel. The reservation signal can be generated locally at the RU. Then, the selected candidate channel can be reported to a Digital Unit (DU) and a transmission configuration associated with the selected candidate channel can be received from the DU. Here, the transmission configuration includes e.g., Modulation and Coding Scheme (MCS), cross-carrier scheduling, channel coding, and the like.

Only when none of the one or more candidate channels is detected to be unoccupied or determined to be clear, i.e., only when none of the one or more candidate channels is clear for transmission in the second transmission period, a CCA failure is reported to the DU. Then, the DU can assign a new channel to be sensed by the RU, as discussed above in connection with FIG. 2.

Optionally, a CCA failure rate can be monitored at the RU and the steps S310-S330 are performed only when the CCA failure rate is higher than a predetermined level. For example, when there are few devices contending for the radio channels and the rate of CCA failure shown at 2.4 of FIG. 2 is very low, e.g. lower than the predetermined level, the pre-CCA in the step S310 may not be triggered so as to save processing resources at the RU and improve resource utilization in the first transmission period.

Figure 8:
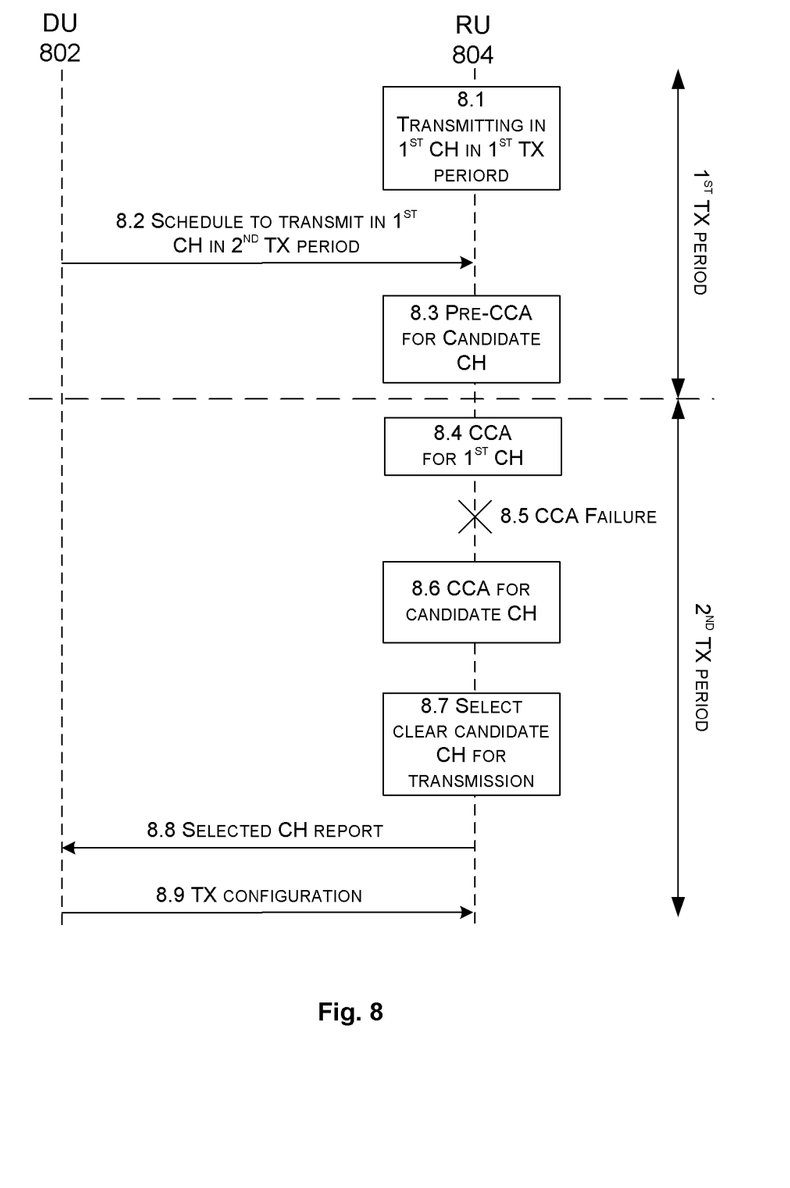
FIG. 8 is a schematic diagram showing a signaling sequence according to an embodiment of the present disclosure.

FIG. 8 is a schematic diagram showing a signaling sequence between a DU 802 and an RU 804 for explaining the above method 300. In a first transmission period, at 8.1, the RU 804 is transmitting in a first channel. At 8.2, the DU 802 schedules the RU 804 to transmit in the first channel in a second transmission period. At 8.3, the RU 804 performs pre-CCA in one or more candidate channels to detect whether the one or more candidate channels are unoccupied.

In the second transmission period, at 8.4, the RU 804 first performs CCA in the first channel. If the first channel is clear, the RU 804 selects the first channel for transmission. Otherwise, if the CCA for the first channel fails at 8.5, at 8.6, the RU 804 performs CCA to determine whether any of the candidate channel(s) detected to be unoccupied at 8.3 is clear or not. If no candidate channel is found to be clear, the process proceeds with the step 2.5 in FIG. 2. Otherwise, if any candidate channel is found to be clear, at 8.7, the RU 804 selects the clear candidate channel for transmission and transmits a reservation signal over the selected channel. At 8.8, the RU 804 reports the selected channel to the DU 802. At 8.9, the RU 804 receives from the DU 802 a transmission configuration associated with the selected channel and then starts data transmission over the selected channel in accordance with the transmission configuration.

Figure 9:
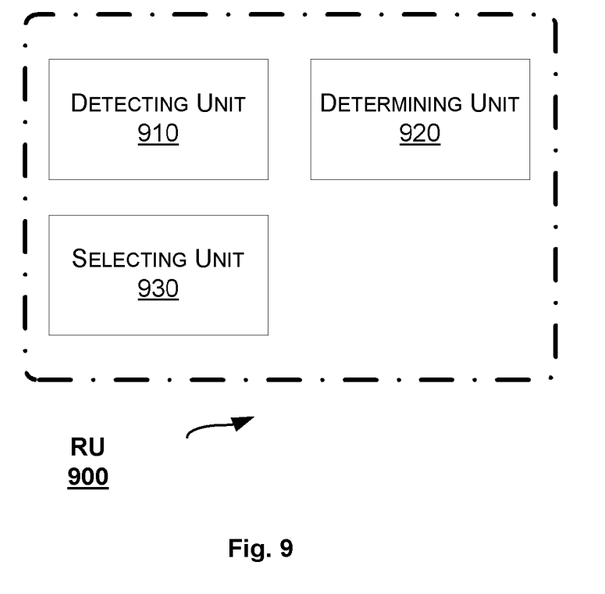
FIG. 9 is a block diagram of an RU according to an embodiment of the present disclosure.

Correspondingly to the method 300 as described above, an RU is provided. FIG. 9 is a block diagram of an RU 900 for facilitating CCA according to an embodiment of the present disclosure. The RU 900 may be implemented in a communication device supporting LBT, such as an AP associated with the SCell 106 as described above, or a terminal device, like terminal 102 as described above with reference to FIG. 1.

As shown in FIG. 9, the RU 900 includes a detecting unit 910 configured to detect, in a first transmission period while the RU is operating in a first channel, whether one or more candidate channels in proximity to the first channel are unoccupied. The RU 900 further includes a determining unit 920 configured to determine, when the first channel is not clear for transmission in a second transmission period, whether any of the one or more candidate channels that is detected to be unoccupied is clear for transmission in the second transmission period. The RU 900 further includes a selecting unit 930 configured to select one of the one or more candidate channels that is determined to be clear, for transmission in the second transmission period.

In an embodiment, the detecting unit 910 is configured to: apply a transmitter shutdown to a transmitter in the RU during one or more predetermined symbols in the first transmission period; sense whether an energy level received in each candidate channel during the one or more predetermined symbols is lower than a predetermined threshold; and detect a candidate channel to be unoccupied when the energy level received in that candidate channel during the one or more predetermined symbols is lower than the predetermined threshold.

In an embodiment, when the transmitter shutdown is applied in two or more predetermined symbols, the detecting unit 910 is configured to sense whether the energy level received in each candidate channel during the one or more predetermined symbols is lower than the predetermined threshold by: calculating an arithmetic or weighted average of the energy levels received in each candidate channel during the two or more predetermined symbols; and determining whether the average is lower than the predetermined threshold.

In an embodiment, the detecting unit 910 is configured to apply the transmitter shutdown by shutting down the transmitter intermittently in each of the one or more predetermined symbols.

In an embodiment, the RU 900 further includes an informing unit (not shown) configured to inform a terminal device of the one or more predetermined symbols.

In an embodiment, the one or more predetermined symbols comprise Guard Period (GP) and Uplink Pilot Time Slot (UpPTS) in a Time Division Duplex (TDD) special subframe.

In an embodiment, the RU 900 further includes an attenuator (not shown) configured to apply an attenuation to a receiver in the RU during one or more predetermined symbols. The detecting unit 910 is configured to: sense whether an attenuated energy level received by the receiver in each candidate channel during the one or more predetermined symbols is lower than a predetermined threshold; and detect a candidate channel to be unoccupied when the attenuated energy level received in that candidate channel during the one or more predetermined symbols is lower than the predetermined threshold.

In an embodiment, the RU 900 further includes a transmitting unit (not shown) configured to transmit a reservation signal over the selected candidate channel; a reporting unit (not shown) configured to report the selected candidate channel to a Digital Unit (DU); and a receiving unit (not shown) configured to receive a transmission configuration associated with the selected candidate channel from the DU.

In an embodiment, the RU 900 further includes a CCA failure reporting unit (not shown) configured to report a CCA failure to a Digital Unit (DU) only when none of the one or more candidate channels is detected to be unoccupied or determined to be clear.

In an embodiment, the selecting unit 930 is configured to select the first channel for transmission in the second transmission period when the first channel is clear for transmission in the second transmission period.

In an embodiment, the RU 900 further includes a monitoring unit (not shown) configured to monitor a CCA failure rate at the RU. The detecting unit 910, the determining unit 920 and the selecting unit 930 are enabled only when the CCA failure rate is higher than a predetermined level.

Each of the units 910-930 and other units that are not shown can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 10:
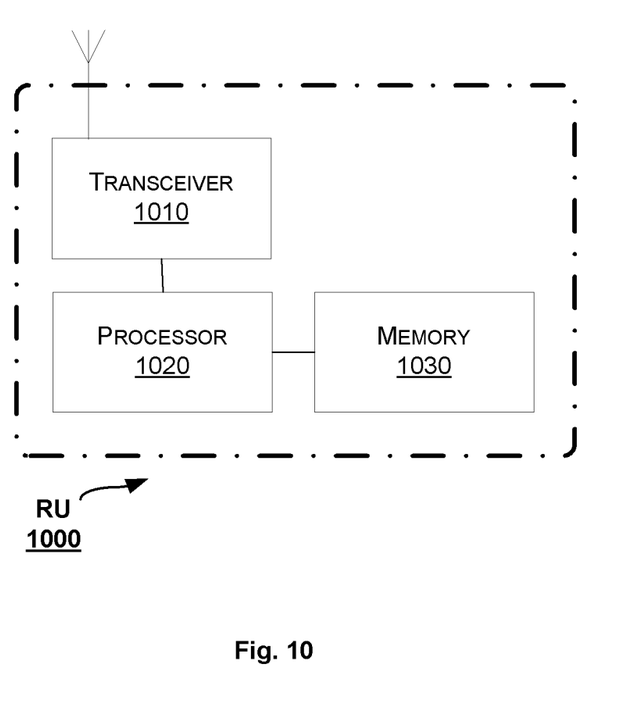
FIG. 10 is a block diagram of an RU according to another embodiment of the present disclosure.

FIG. 10 is a block diagram of an RU 1000 according to another embodiment of the present disclosure.

The RU 1000 can be provided for facilitating CCA. The RU 1000 may be implemented in a communication device supporting LBT, such as an AP associated with the SCell 106 as described above, or a terminal device, like terminal 102 as described above with reference to FIG. 1.

The RU 1000 includes a transceiver 1010, a processor 1020 and a memory 1030. The memory 1030 contains instructions executable by the processor 1020 whereby the RU 1000 is operative to perform the actions, e.g., of the procedure described earlier in conjunction with FIG. 3. Particularly, the memory 1030 contains instructions executable by the processor 1020 whereby the RU 1000 is operative to: detect, in a first transmission period while the RU is operating in a first channel, whether one or more candidate channels in proximity to the first channel are unoccupied; determine, when the first channel is not clear for transmission in a second transmission period, whether any of the one or more candidate channels that is detected to be unoccupied is clear for transmission in the second transmission period; and select one of the one or more candidate channels that is determined to be clear, for transmission in the second transmission period.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 1020 causes the RU 1000 to perform the actions, e.g., of the procedure described earlier in conjunction with FIG. 3.

The computer program product may be configured as a computer program code structured in computer program modules. The computer program modules could essentially perform the actions of the flow illustrated in FIG. 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a Radio Unit (RU) for facilitating Clear Channel Assessment (CCA), comprising:
   detecting, in a first transmission period while the RU is operating in a first channel, whether one or more candidate channels in proximity to the first channel are unoccupied;
   applying a transmitter shutdown to a transmitter in the RU during one or more predetermined symbols in the first transmission period;
   determining, in response to a determination that the first channel is not clear for transmission in a second transmission period, whether any of the one or more candidate channels detected to be unoccupied are clear for transmission in the second transmission period;
   sensing whether an energy level received in each of the one or more candidate channel during the one or more predetermined symbols is lower than a predetermined threshold and, if so, deeming the candidate channel to be unoccupied; and selecting one of the candidate channels determined to be clear, for transmission in the second transmission period.

2. The method of claim 1, wherein, in response to the transmitter shutdown being applied in two or more predetermined symbols, the sensing comprises:

calculating an arithmetic or weighted average of the energy levels received in each candidate channel during the two or more predetermined symbols; and determining whether the average is lower than the predetermined threshold and, if so, deeming the candidate channel to be unoccupied.

3. The method of claim 1, wherein applying the transmitter shutdown comprises shutting down the transmitter intermittently in each of the one or more predetermined symbols.

4. The method of claim 1, further comprising:

informing a terminal device of the one or more predetermined symbols.

5. The method of claim 1, wherein the one or more predetermined symbols comprise a Guard Period (GP) and an Uplink Pilot Time Slot (UpPTS) in a Time Division Duplex (TDD) special subframe.

6. The method of claim 1, wherein the detecting comprises:

applying an attenuation to a receiver in the RU during one or more predetermined symbols; and sensing whether an attenuated energy level received by the receiver in each candidate channel during the one or more predetermined symbols is lower than a predetermined threshold and, if so, deeming the candidate channel to be unoccupied.

7. The method of claim 1, further comprising:

transmitting a reservation signal over the selected candidate channel;

reporting the selected candidate channel to a Digital Unit (DU); and receiving a transmission configuration associated with the selected candidate channel from the DU.

8. The method of claim 1, further comprising:

reporting a CCA failure to a Digital Unit (DU), only in response to a determination that none of the one or more candidate channels is detected to be unoccupied or determined to be clear.

9. The method of claim 1, further comprising:

selecting the first channel for transmission in the second transmission period in response to a determination that the first channel is clear for transmission in the second transmission period.

10. The method of claim 1, further comprising:

monitoring a CCA failure rate at the RU, wherein the detecting, determining and selecting are performed only in response to a determination that the CCA failure rate is higher than a predetermined level.

11. A Radio Unit (RU) configured for facilitating Clear Channel Assessment (CCA), comprising:

a transceiver;

a processor; and a memory, the memory containing instructions executable by the processor whereby the RU is operative to:

detect, in a first transmission period while the RU is operating in a first channel, whether one or more candidate channels in proximity to the first channel are unoccupied;

apply a transmitter shutdown to a transmitter in the RU during one or more predetermined symbols in the first transmission period;

determine, in response to a determination that the first channel is not clear for transmission in a second transmission period, whether any of the one or more candidate channels detected to be unoccupied are clear for transmission in the second transmission period;

sense whether an energy level received in each of the one or more candidate channel during the one or more predetermined symbols is lower than a predetermined threshold and, if so, deeming the candidate channel to be unoccupied; and select one of the candidate channels determined to be clear, for transmission in the second transmission period.

* * * * *